(12) United States Patent
Kim et al.

(10) Patent No.: US 8,655,346 B2
(45) Date of Patent: Feb. 18, 2014

(54) MOBILE DEVICE AND METHOD FOR CONTROLLING REPRODUCTION OF CONTENTS IN MOBILE DEVICE

(75) Inventors: Mikyung Kim, Seoul (KR); Seokhee Lee, Seoul (KR); Myonggu Lee, Gyeonggi-Do (KR); Seongpyo Hong, Gyeonggi-Do (KR); Sanghyuk Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/439,004

(22) Filed: Apr. 4, 2012

(65) Prior Publication Data

US 2013/0078990 A1 Mar. 28, 2013

(30) Foreign Application Priority Data

Sep. 22, 2011 (KR) ........................ 10-2011-0095954

(51) Int. Cl.
*H04W 4/00* (2009.01)
*H04W 88/02* (2009.01)

(52) U.S. Cl.
USPC ....................... 455/422.1; 455/566

(58) Field of Classification Search
USPC ............. 455/412.1, 414.1–414.4, 422.1, 466, 455/566
See application file for complete search history.

(56) References Cited

U.S. PATENT DOCUMENTS

2009/0248702 A1* 10/2009 Schwartz et al. ............... 707/10

FOREIGN PATENT DOCUMENTS

| JP | 2008-257627 A | 10/2008 |
|---|---|---|
| JP | 2011-90469 A | 5/2011 |
| KR | 10-2011-0064628 A | 6/2011 |
| KR | 10-2011-0070612 A | 6/2011 |

* cited by examiner

*Primary Examiner* — Kashif Siddiqui
(74) *Attorney, Agent, or Firm* — Birch, Stewart, Kolasch & Birch, LLP

(57) ABSTRACT

A method of controlling a mobile device and which includes wirelessly communicating, via a wireless communication unit of the mobile terminal, with other devices existing in a network including the mobile terminal; displaying, on a display unit of the mobile terminal, a multimedia file display region displaying contents existing in one of the devices in the network including the mobile device; and displaying, on the display unit, a reproduction control region including a first region displaying a first reproduction device for reproducing a first content selected from the multimedia file display region, and a second region for displaying the reproduced first content.

22 Claims, 28 Drawing Sheets

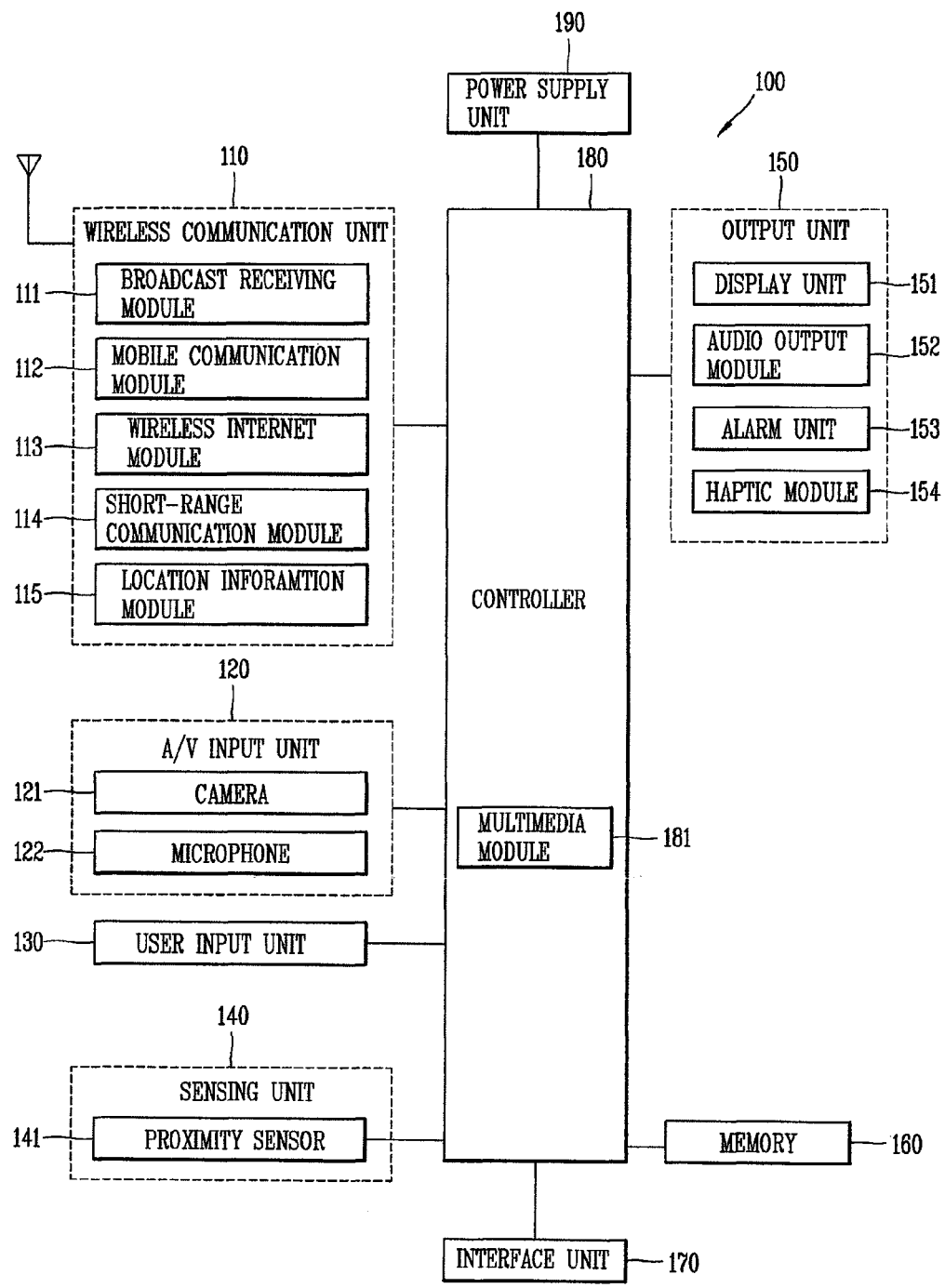

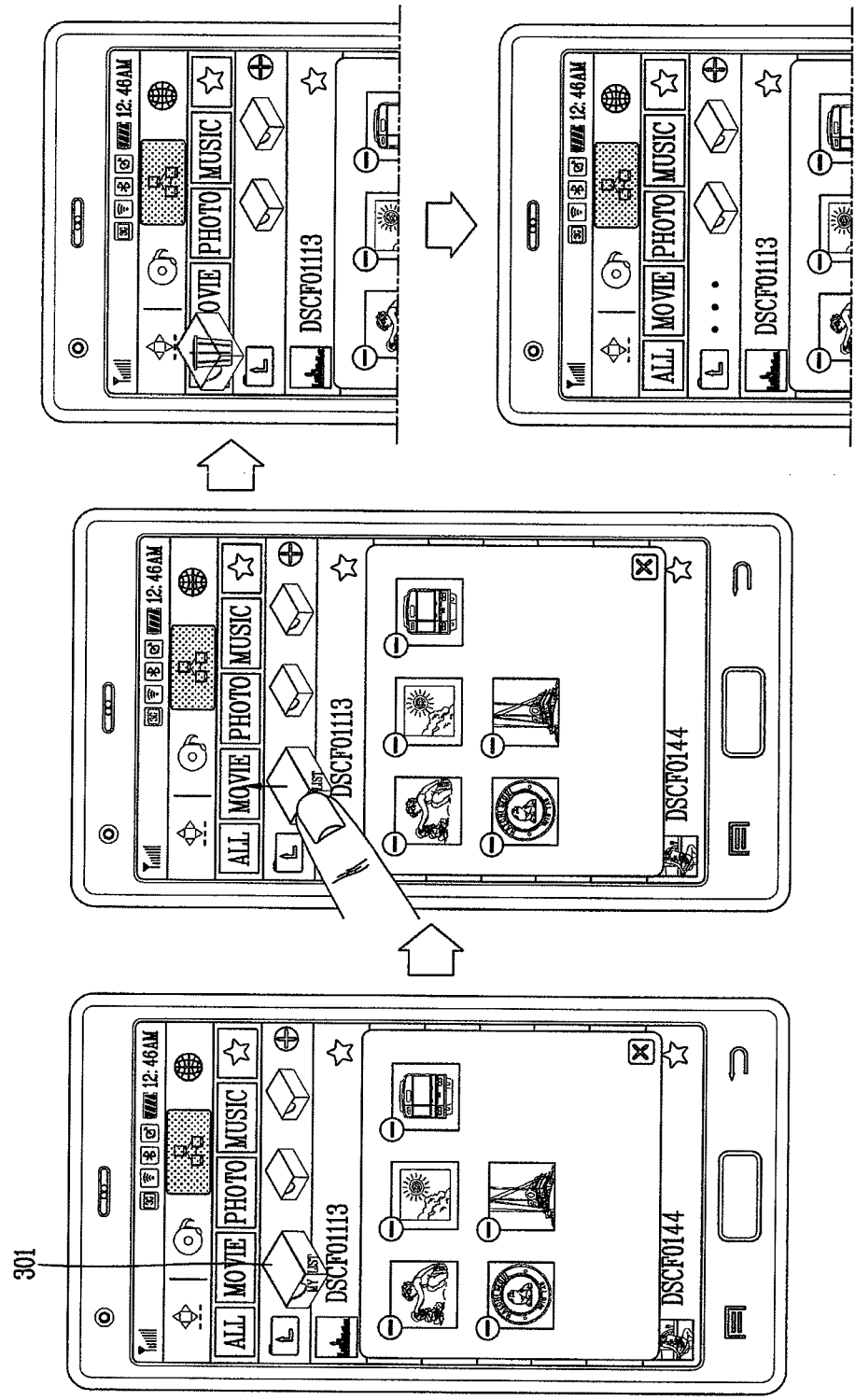

FIG. 9A
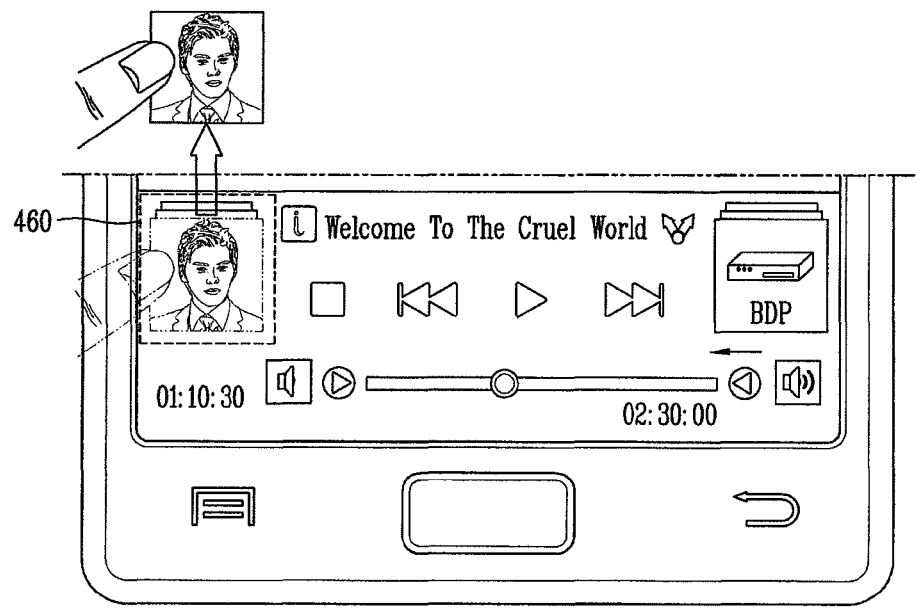
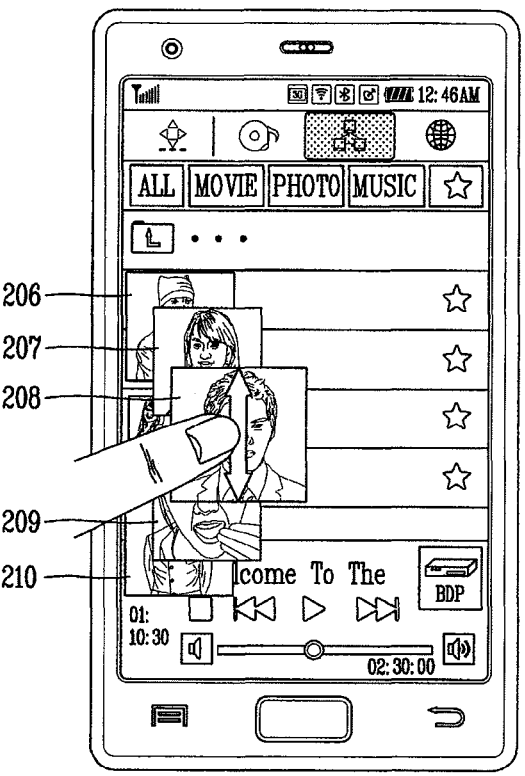

FIG. 9C
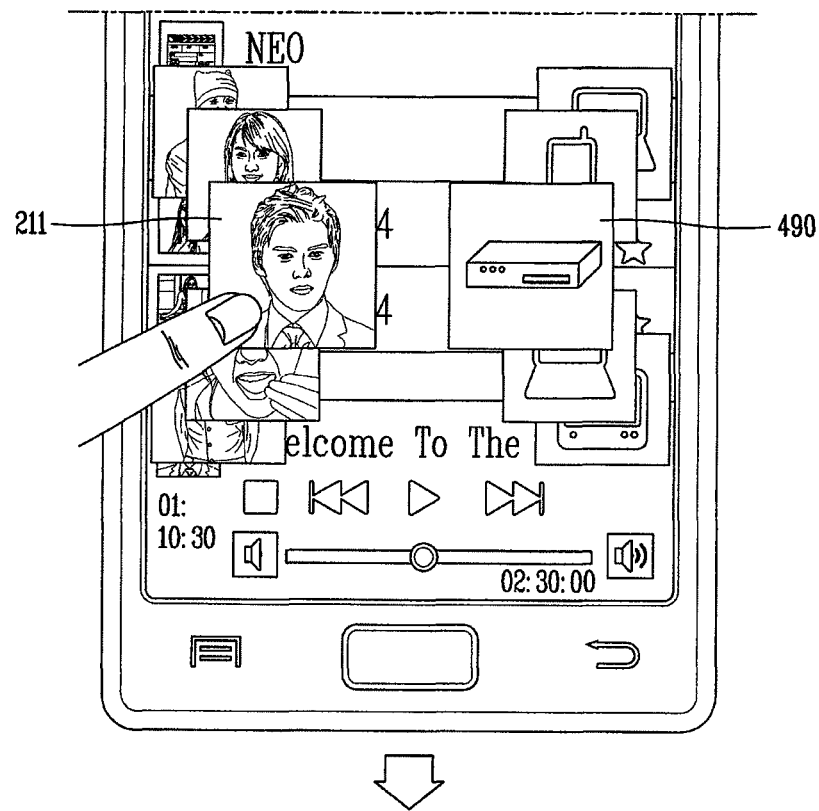
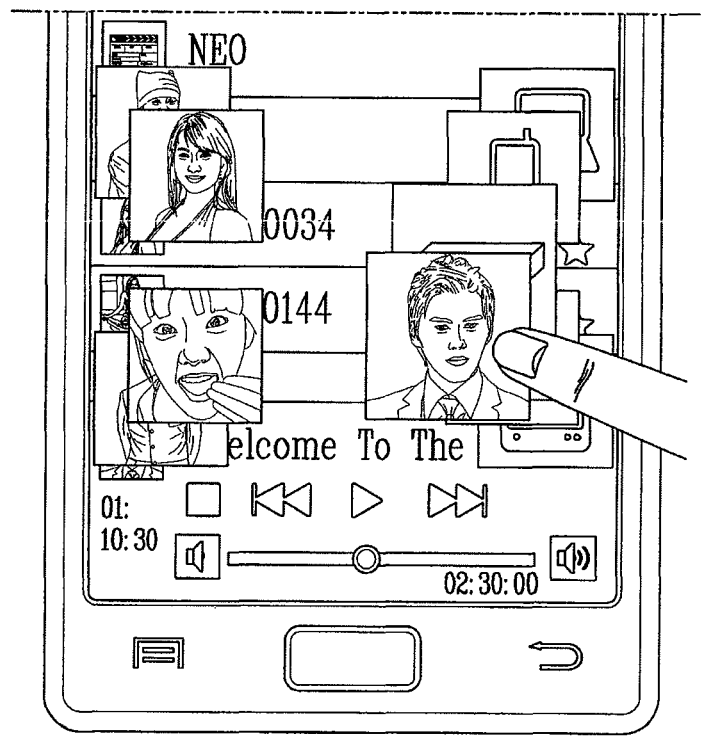

FIG. 10B
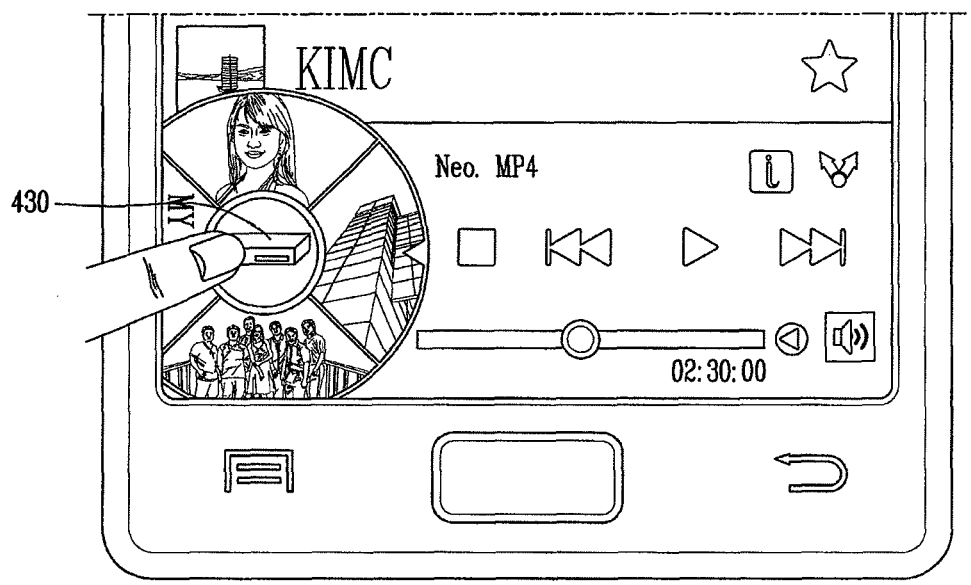
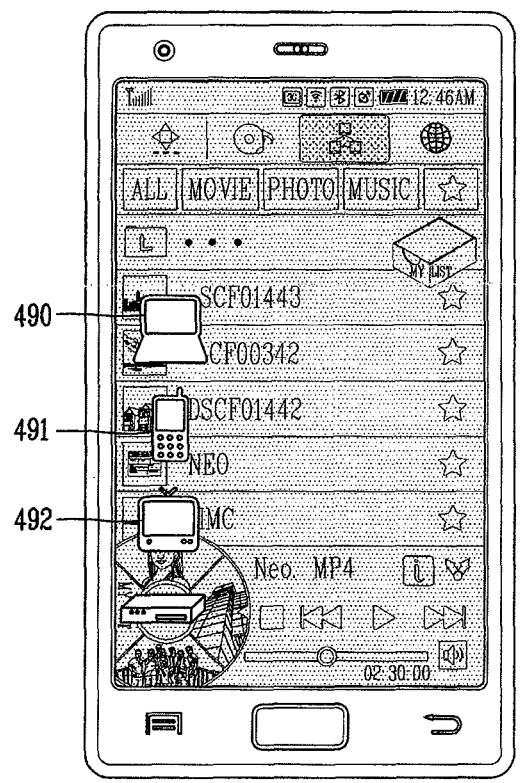

MOBILE DEVICE AND METHOD FOR CONTROLLING REPRODUCTION OF CONTENTS IN MOBILE DEVICE

CROSS-REFERENCE TO A RELATED APPLICATION

Pursuant to 35 U.S.C. §119(a), this application claims the benefit of Korean Application No. 10-2011-0095954, filed on Sep. 22, 2011, the contents of which is incorporated by reference herein in its entirety.

BACKGROUND OF THE INVENTION

1. Field of the Invention

The present information relates to a content reproduction control method using a mobile device and the mobile device employing the same.

2. Description of the Related Art

A mobile device may be configured to perform various functions. The examples of such various functions may include a data and voice communication function, a function of capturing still or moving images through a camera, a voice storage function, a function of playing music files through a speaker system, an image or video display function, and the like. Some mobile devices may include an additional function capable of implementing games, and some other mobile devices may be implemented as a multimedia player. Moreover, recent mobile devices may receive broadcast or multicast signals, thereby allowing a user to view video or television programs.

Furthermore, efforts for supporting and enhancing the functions of the mobile device have been continued. The foregoing efforts may include the improvement of software and hardware as well as the change or improvement of structural elements constituting a mobile device.

In order to deal with such a request, recent mobile devices may support a digital living network alliance (DLNA) function.

In general, DLNA is a function capable of allowing the user to freely share multimedia contents via a network. The DLNA function may have an advantage capable of freely sharing multimedia contents such as music files, photos, videos, and the like via a network between electronic devices (e.g., computers, TVs, and others) manufactured based on the DLNA guideline as well as mobile devices.

For instance, an electronic device supporting the DLNA function may be connected to a home network through WiFi to allow the user to check or display multimedia contents (photos, videos) stored in a mobile device through TV or PC. In other words, products designed based on the DLNA guideline may freely share multimedia contents such as music files, photos, videos and the like with one another via a home network.

Furthermore, the sharing and reproduction of multimedia files between devices within a home network may be controlled by using a mobile device. However, when a plurality of devices share and reproduce a plurality of multimedia files, it is a situation that there exist insufficient methods for easily and intuitively managing this.

On the other hand, a touch function of the mobile device may allow the user who is unfamiliar with a button/key input to conveniently perform the operation of the terminal using a touch screen, and in recent years, the touch function becomes an important feature of the mobile device together with a user interface (UI) as well as simple input. Accordingly, the touch function may be applicable to mobile devices in more various forms, and therefore, the development of a user interface (UI) that is suitable to the purpose will be further required.

As a result, a method of easily and intuitively managing a situation where a plurality of contents are reproduced in a plurality of reproduction devices supporting the DLNA function may be required to be applied to mobile devices.

SUMMARY OF THE INVENTION

Accordingly, an objective of the present disclosure is to provide schemes for solving the foregoing problems.

More specifically, an objective of the present disclosure is to provide a scheme for easily and intuitively managing a list.

Furthermore, an objective of the present disclosure is to provide a scheme for easily and intuitively reproducing and controlling multimedia files.

In addition, an objective of the present disclosure is to provide an easy and intuitive reproduction control scheme between multiple reproduction devices and multiple multimedia files.

According to the present invention, there is provided a mobile device and a method of controlling the reproduction of contents in the mobile device as described below to solve the foregoing problems.

According to an aspect of the present invention, there is provided a method of controlling the reproduction of contents in a mobile device, and the method may include displaying contents existing in a network including the mobile device, displaying reproduction devices existing in the network including the mobile device, and displaying a reproduction control screen for controlling the reproduction of a specific content on a specific reproduction device when receiving an input for the specific reproduction device among the reproduction devices existing in the network and an input for the specific content among the contents existing in the network, wherein the reproduction control screen comprises a region showing reproduction devices being controlled by the mobile device and a region showing contents being reproduced on the reproduction device.

According to another aspect of the present invention, the method may be characterized in that the input for the specific reproduction device and the input for the specific content are carried out by dragging the specific content to the specific reproduction device or dragging the specific reproduction device to the specific content.

According to still another aspect of the present invention, the method may further include displaying a reproduction device that can be controlled by the mobile device when an input to the region showing reproduction devices is received from the user.

According to still another aspect of the present invention, the method may further include displaying at least one content existing in the network including the mobile device when an input to the region showing contents being reproduced is received from the user.

According to still another aspect of the present invention, the method may further include controlling the selected device to reproduce the selected content when an input for reproducing a content selected from the contents existing in a network including a mobile device is received by a device selected from the devices that can be controlled by the mobile device.

According to still another aspect of the present invention, the method may be characterized in that the content is a multimedia file.

According to still another aspect of the present invention, the method may be characterized in that the content is a play list including at least one multimedia file.

According to still another aspect of the present invention, the method may further include controlling a multimedia file located prior to or subsequent to the multimedia file being reproduced existing within the play list to be reproduced when an input to the region showing the contents being reproduced is received from the user.

According to still another aspect of the present invention, the method may be characterized in that a message window for receiving an input from the user is displayed when the specific reproduction device does not support a multimedia file included in the selected play list.

According to still another aspect of the present invention, the method may further include displaying a predetermined message when a connection between the specific reproduction device and the mobile device is disconnected.

According to still another aspect of the present invention, the method may further include displaying a connection relation between a content existing in the network including the mobile device and at least one reproduction device existing in the network including the mobile device.

According to still another aspect of the present invention, the method may further include displaying a reproduction device reproducing the content by the user's selection to the displayed content.

According to still another aspect of the present invention, the method may further include displaying a content being reproduced on the device by the user's selection to the displayed device.

According to still another aspect of the present invention, the method may further include receiving an input for changing the connection relation.

According to still another aspect of the present invention, the method may be characterized in that a connection path is displayed with a different color for each reproduction device or each content when a connection relation between a reproduction device and a content is shown as the connection path.

According to an aspect of the present invention, there is provided a method of controlling the reproduction of contents in a mobile device, and the method may include displaying multimedia files existing in a network including the mobile device, displaying a play list including at least one of the multimedia files; and displaying a screen for changing the play list by the user's selection, wherein the change of the play list is at least one of adding a multimedia file to the play list, deleting a multimedia file included in the play list, adding a new play list, deleting a play list, and merging a plurality of play lists.

According to another aspect of the present invention, the method may further include adding a multimedia file selected by the user among the multimedia files to the play list.

According to still another aspect of the present invention, the method may further include deleting a multimedia file selected by the user among multimedia files included in the play list from the play list.

According to still another aspect of the present invention, the method may further include adding a new play list.

According to still another aspect of the present invention, the method may further include deleting a play list selected by the user.

According to still another aspect of the present invention, the method may further include merging a plurality of play lists selected by the user.

According to an aspect of the present invention, there is provided a mobile device for controlling the reproduction of contents in a reproduction device, and the mobile device may include a display unit configured to display contents existing in a network including the mobile device, and a controller configured to control to display reproduction devices existing in the network including the mobile device, and display a reproduction control screen for controlling the reproduction of a specific content on a specific reproduction device when receiving an input for the specific reproduction device among the reproduction devices existing in the network and an input for the specific content among the contents existing in the network, wherein the reproduction control screen comprises a region showing reproduction devices being controlled by the mobile device and a region showing contents being reproduced on the reproduction device.

According to another aspect of the present invention, there is provided a mobile device for controlling the reproduction of contents in a mobile device, and the mobile device may include a display unit configured to display multimedia files existing in a network including the mobile device, and display a play list including at least one of the multimedia files, and a controller configured to control to display a screen for changing the play list by the user's selection to be displayed on the display unit, wherein the change of the play list is at least one of adding a multimedia file to the play list, deleting a multimedia file included in the play list, adding a new play list, deleting a play list, and merging a plurality of play lists.

The foregoing problems of the related art will be solved by disclosing the present disclosure.

More specifically, a scheme for easily and intuitively managing a play list will be provided to the user by disclosing the present disclosure.

Furthermore, a scheme for easily and intuitively reproducing and controlling multimedia files will be provided to the user by disclosing the present disclosure.

Furthermore, an easy and intuitive reproduction control scheme between multiple reproduction devices and multiple multimedia files will be provided to the user by disclosing the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating an mobile device according to an embodiment disclosed in the present disclosure;

DETAILED DESCRIPTION OF THE INVENTION

Figure 2A:
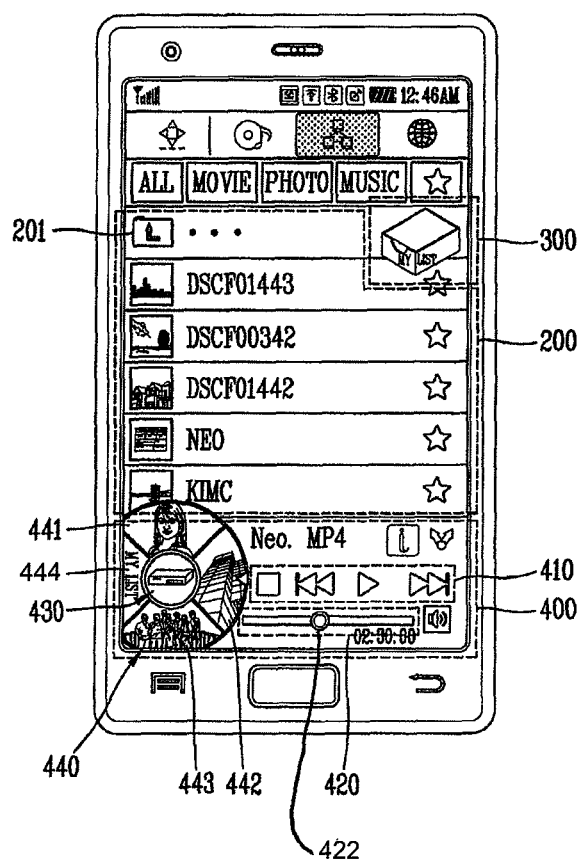
FIG. 2 is a view illustrating a screen displayed on a display unit of the mobile device when the reproduction of contents in a reproduction device is controlled by using the mobile device.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the technological spirit disclosed herein by the accompanying drawings.

A mobile device disclosed herein may include a portable phone, a smart phone, a laptop computer, a digital broadcast mobile device, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile device according to an embodiment disclosed herein.

The mobile device 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile device may be implemented with greater or less number of elements than those illustrated elements.

Hereinafter, the constituent elements will be described in sequence.

The wireless communication unit 110 typically includes one or more elements allowing radio communication between the mobile device 100 and a wireless communication system, or allowing radio communication between radio communication the mobile device 100 and a network in which the mobile device 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile device 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The mobile communication module 112 may be configured to implement an video communication mode and a voice communication mode. The video communication mode refers to a configuration in which communication is made while viewing an image of the counterpart, and the voice communication mode refers to a configuration in which communication is made without viewing an image of the counterpart. The mobile communication module 112 may be configured to transmit or receive at least one of voice or image data to implement the video communication mode and voice communication mode.

The wireless Internet module 113 means a module for supporting wireless Internet access. The wireless Internet module 113 may be built-in or externally installed to the mobile device 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile device, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile device.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile device 100 such as an opened or closed state of the mobile device 100, a location of the mobile device 100, an orientation of the mobile device 100, and the like, and generates a sensing signal for controlling the operation of the mobile device 100. For example, when the mobile device 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile device 100. For example, when the mobile device 100 is in a phone call mode, the display unit 151 may display a User Interface (UI) or a Graphic User Interface (GUI) associated with a call. When the mobile device 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile device body through a region occupied by the display unit 151 of the mobile device body.

Two or more display units 151 may be implemented according to a configured aspect of the mobile device 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an inter-layer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile device 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile device 100, e.g., sound alarming a call received or a message received, and so on. The audio output module 152 may include a receiver, a speaker, a buzzer, and so on.

The alarm 153 outputs signals notifying occurrence of events from the mobile device 100. The events occurring from the mobile device 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile device 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile device 100 may operate a web storage which performs the storage function of the memory 160 on the Internet.

The interface unit 170 may generally be implemented to interface the mobile device with external devices. The interface unit 170 may allow a data reception from an external device, a power delivery to each component in the mobile device 100, or a data transmission from the mobile device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile device 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile device 100 via a port.

Also, the interface unit 170 may serve as a path for power to be supplied from an external cradle to the mobile device 100 when the mobile device 100 is connected to the external cradle or as a path for transferring various command signals inputted from the cradle by a user to the mobile device 100. Such various command signals or power inputted from the cradle may operate as signals for recognizing that the mobile device has accurately been mounted to the cradle.

The controller 180 typically controls the overall operations of the mobile device 100. For example, the controller 180 performs the control and processing associated with telephony calls, data communications, video calls, and the like. Furthermore, the controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image. The power supply unit 190 receives external power and internal power under the control of the controller 180 to provide power required by various components.

Various embodiments described herein may be implemented in a medium that can be read by a computer or similar device using software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For a software implementation, the embodiments such as procedures or functions may be implemented together with separate software modules. The software modules may perform at least one function or operation described herein.

Software codes can be implemented by a software application written in any suitable programming language. The software codes may be stored in the memory 160 and executed by the controller 180.

Furthermore, the controller 180 may detect information included in an object selected by the user among at least one object displayed on the display unit 151.

Furthermore, the controller 180 may detect a signal received at the object selected by the user.

Here, the object is a subject on which the user's intention or act has an effect, and for example, may include an image, a video, an icon, an email, a memo, an SNS posting, an incoming or outgoing content of phone call or instant message, and the like. There may also exist various kinds of objects other than the foregoing examples.

Hereinafter, referring to FIG. 2, the detailed embodiment of allowing a mobile device to control the reproduction of contents in a reproduction device will be described. The contents and reproduction device may exist in a network including the mobile device.

Figure 2B:
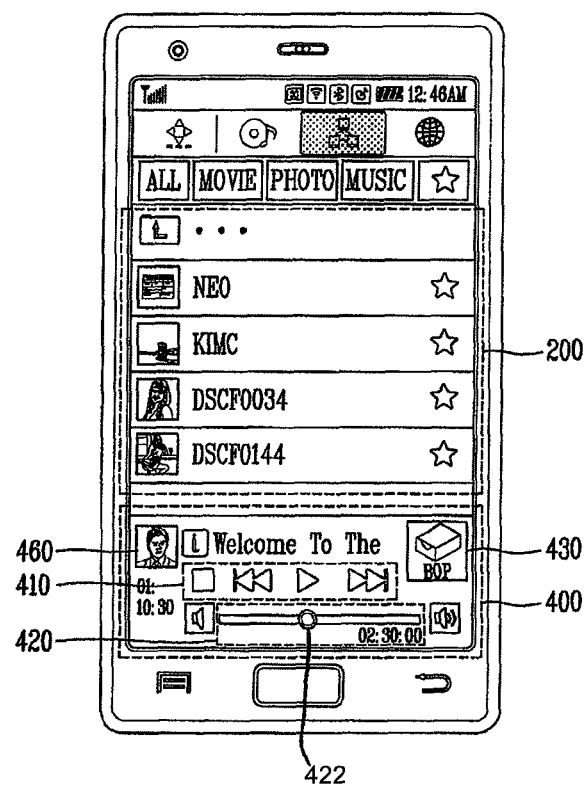

FIG. 2 is a view illustrating a screen displayed on a display unit of the mobile device when the reproduction of contents in a reproduction device is controlled by using the mobile device. FIG. 2A is a view illustrating a control screen displayed on a display unit of the mobile device controlling the reproduction device when a predetermined multimedia file list is reproduced in a predetermined reproduction device. FIG. 2B is a view illustrating a control screen displayed on a display unit of the mobile device controlling the reproduction device when a predetermined multimedia file is reproduced in a predetermined reproduction device.

Referring to FIG. 2A, the control screen may include a multimedia file display region 200, a play list display region 300, and a reproduction control region 400.

A mobile device according to an embodiment disclosed herein may include a display unit 151 disposed at a surface thereof, for example, a front surface thereof, and the display unit 151 may be configured to receive a touch input from the user. The touch input may include a single touch input, a double touch input, a sliding touch input, a flicking touch input, a dragging touch input, and the like. On the other hand, when the user selects an object displayed on the display unit 151, the object may be selected by the touch input.

Furthermore, the controller 180 may perform a preset function based on the touch input from the user. Furthermore, the memory 160 may store a control operation corresponding to the touch input.

The multimedia file display region 200 may display a multimedia file existing in a network including a mobile device.

For example, when the mobile device accesses a predetermined digital media server (DMS), the multimedia file display region 200 may display multimedia files included in the digital media server connected to the mobile device in the form of a list. Furthermore, in order to allow the user to check multimedia files included in another digital media server, the mobile device may display an icon 201 associated with digital media server switching in the multimedia file display region 200. In other words, the icon 201 may be used to access another digital media server other than the digital media server currently accessed by the mobile device. In this manner, the mobile device may receive a touch input from the user through a separate icon 201, and access all digital media servers supporting DLNA according to the foregoing input. Accordingly, the mobile device may display multimedia files included in each digital media server using the multimedia file display region 200.

The play list display region 300 may display a play list for multimedia files. The play list may include a list of multimedia files and may be displayed in a separate icon.

The reproduction control region 400 is a region for controlling the reproduction of contents in a reproduction device. The reproduction device and contents may exist in a network including a mobile device.

The reproduction control region 400 may include a reproduction controller 410, a reproduction time display unit 420, a reproduction device display unit 430, and a play list display unit 440.

The reproduction device display unit 430 may show reproduction devices being controlled by the mobile device.

The play list display unit 440 may display a play list being reproduced by a reproduction device displayed on the reproduction device display unit 430. The play list display unit 440 may display the title 444 of a play list currently being reproduced by the reproduction device. The play list display unit 440 may display not only a multimedia file 442 being reproduced by the reproduction device but also a multimedia file 443 included in a play list to be reproduced subsequent to a multimedia file 442 being reproduced, and a multimedia file 441 that has been reproduced prior to the multimedia file 442 being reproduced. The units 430 and 440 can also be displayed in the shape of a wheel (FIG. 2A).

The reproduction controller 410 may receive a touch input associated with the reproduction control of the reproduction device. Inputs associated with the reproduction control may include play, stop, play a next multimedia file, play a previous multimedia file, and the like.

The reproduction time display unit 420 may display a total play time, a current play time, and the like, for the multimedia file being reproduced in the reproduction device.

Figure 2C:
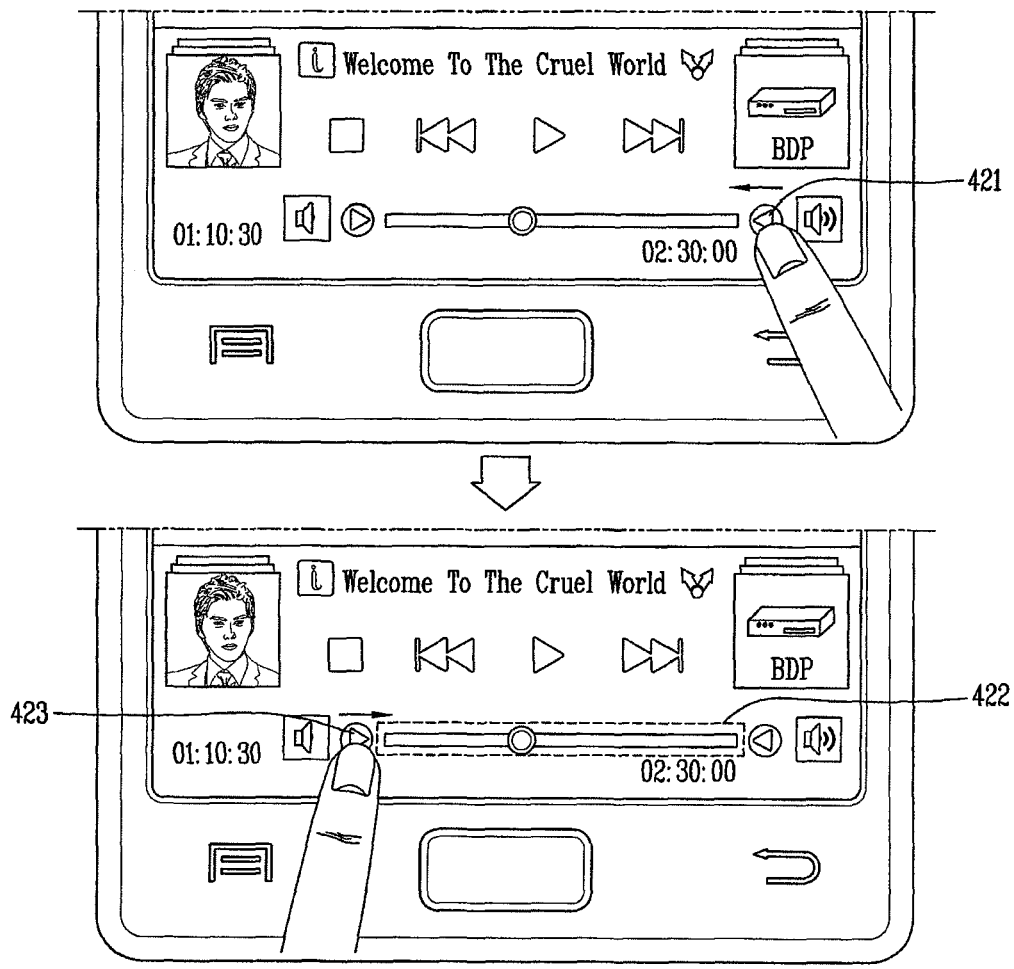

On the other hand, an audio volume adjustment unit 422 may be displayed in a region displayed with the reproduction time display unit 420. Referring to FIG. 2C, the controller may display the audio volume adjustment unit 422 in a region displayed with the reproduction time display unit 420 by means of a touch input on a predetermined icon 421 displayed on the display unit. Furthermore, the controller may display the reproduction time display unit 420 in a region displayed with the audio volume adjustment unit 422 by means of a touch input to a predetermined icon 423 displayed on the display unit on a control screen displayed with the audio volume adjustment unit 422. Using the audio volume adjustment unit 422, the user may adjust the volume of a mobile device being displayed on the reproduction device display unit.

FIG. 2B is a control screen displayed on a display unit of the mobile device when receiving an input for reproducing a predetermined multimedia file in a predetermined reproduction device. On the control screen, a multimedia file display region 200, a reproduction controller 410, a reproduction time display unit 420, and a reproduction device display unit 430 are the same as the foregoing description, and therefore, the detailed description thereof will be omitted.

On the other hand, the reproduction control region 400 may include a reproduction multimedia file display unit 460.

The reproduction multimedia file display unit 460 may display multimedia files being reproduced by a reproduction device displayed on the reproduction device display unit. The title 414 in FIG. 2A may also represent the title of the play list shown in display region 460.

The specific control using the control screen will be described later.

First, a method of changing a play list using the control screen will be described in detail.

Figure 3:
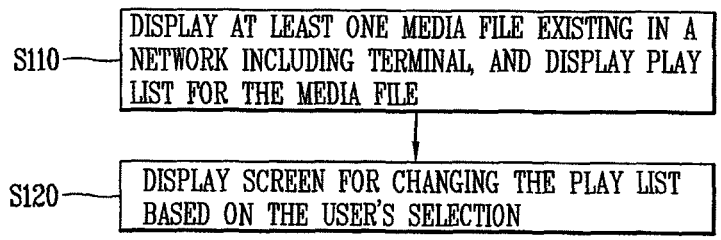
FIG. 3 is a flow chart illustrating a method of changing a play list according to an embodiment of the present invention.

FIG. 3 is a flow chart illustrating a method of changing a play list according to an embodiment of the present invention, and FIGS. 4 and 5 illustrate an exemplary screen for the method of changing a play list illustrated in FIG. 3.

First, referring to FIG. 3, the controller 180 may display multimedia files and a play list existing in a network including the mobile device on the display unit 151 (S110). Then, if the play list displayed on the display unit 151 is selected by the user, then the controller 180 may display a screen for changing the play list (S120).

The method for allowing the user to select the list may include a single touch input, a double touch input, and the like.

Furthermore, a screen for changing the play list may include a screen for adding a new multimedia file to the play list, a screen for deleting a multimedia file included in the play list, a screen for deleting the play list, a screen for adding a new play list, and the like.

The memory 160 may include screen information to be displayed corresponding to a method in which the user selects the play list.

For example, if the user performs a single touch input to the play list, then the controller may display a screen for adding a new multimedia file to the play list on the display unit. Furthermore, if the user performs a double touch input to the icon, then the controller may display a screen for deleting a multimedia file included in the play list, a screen for deleting the play list, a screen for adding a new play list, and a screen for merging play lists at the same time on the display unit.

In addition, the method of determining a screen displayed on the display unit may be determined in various ways by corresponding to the user's selection to the play list.

FIG. 4 is an exemplary view illustrating the process of adding a new multimedia file to a play list.

Figure 4A:
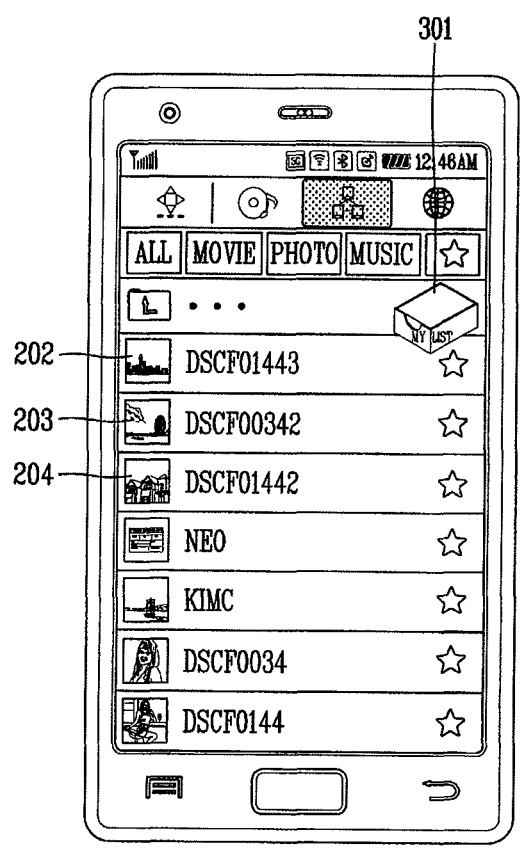
FIG. 4 illustrates an exemplary screen for the method of changing a play list illustrated in FIG. 3.
Figure 4B:
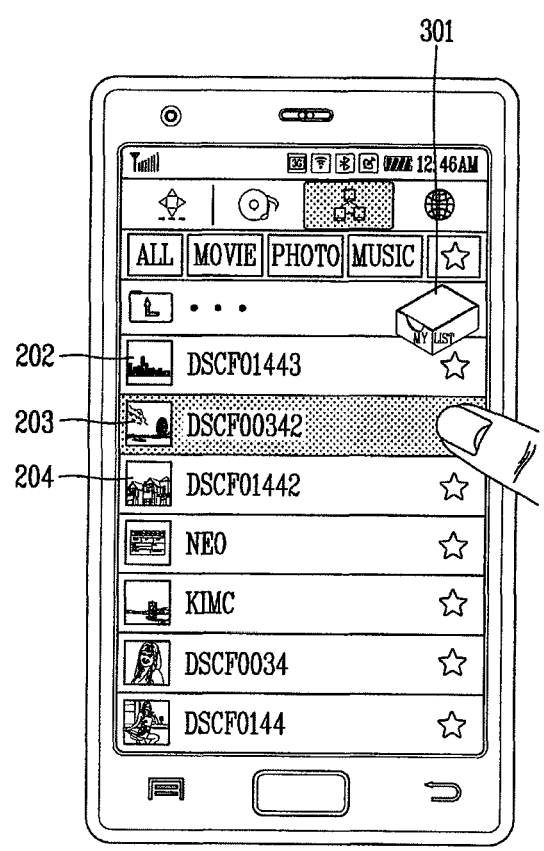

Referring to FIG. 4A, a multimedia file display region 200 may include multimedia files 202, 203, 204. Furthermore, a play list display region 300 may include a play list 301.

If the play list 301 displayed on the display unit is selected by the user, then the controller may switch a screen displayed on the display unit to a screen capable of adding a multimedia file selected from the multimedia files displayed on the multimedia file display region to the play list 301 (refer to FIG. 4A).

On the screen, the mobile device may receive an input for a multimedia file to be added from the user. For instance, the user may select any one multimedia file 203 among the multimedia files displayed on the multimedia file display region 200 by a touch input (refer to FIG. 4B)

The selected multimedia file 203 may be added to the play list 301. For instance, when multimedia files included in the play list 301 are A, B, and C, then A, B, C, and DSCF00342 may be included in the play list 301 after the add operation.

Figure 4C:
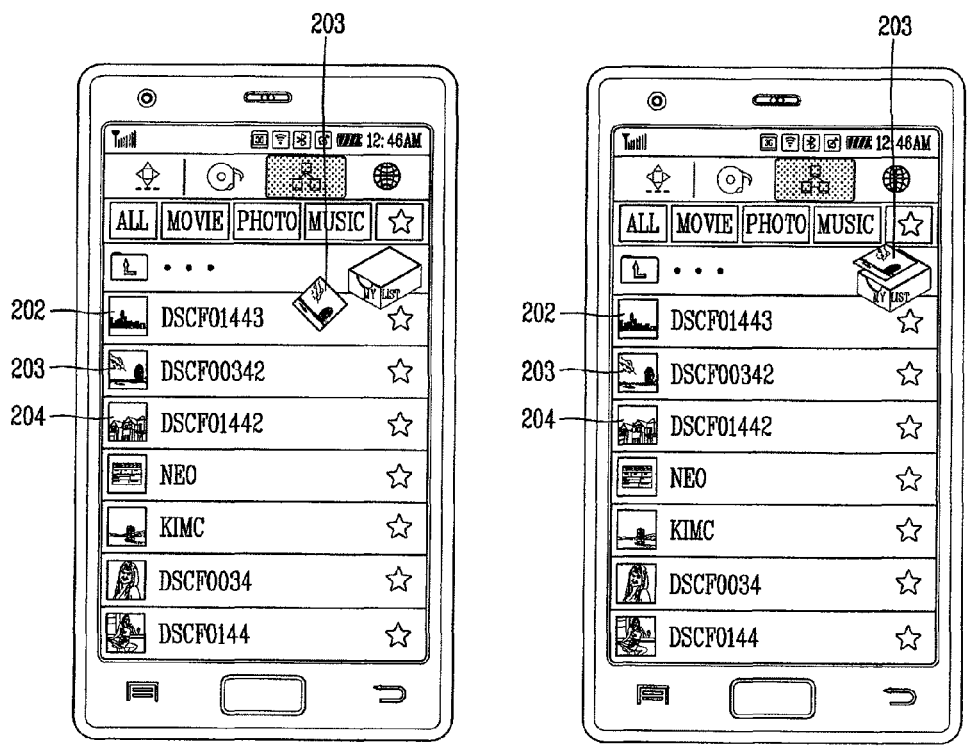

Referring to FIG. 4C, when the selected multimedia file 203 is added to the play list 301, then the controller may display an animation showing that the selected multimedia file is being added to the play list to provide a visual interest to the user.

FIG. 5 is an exemplary view illustrating the process of deleting a multimedia file, the process of deleting a play list, the process of adding a new play list, and the process of merging play lists.

Figure 5A:
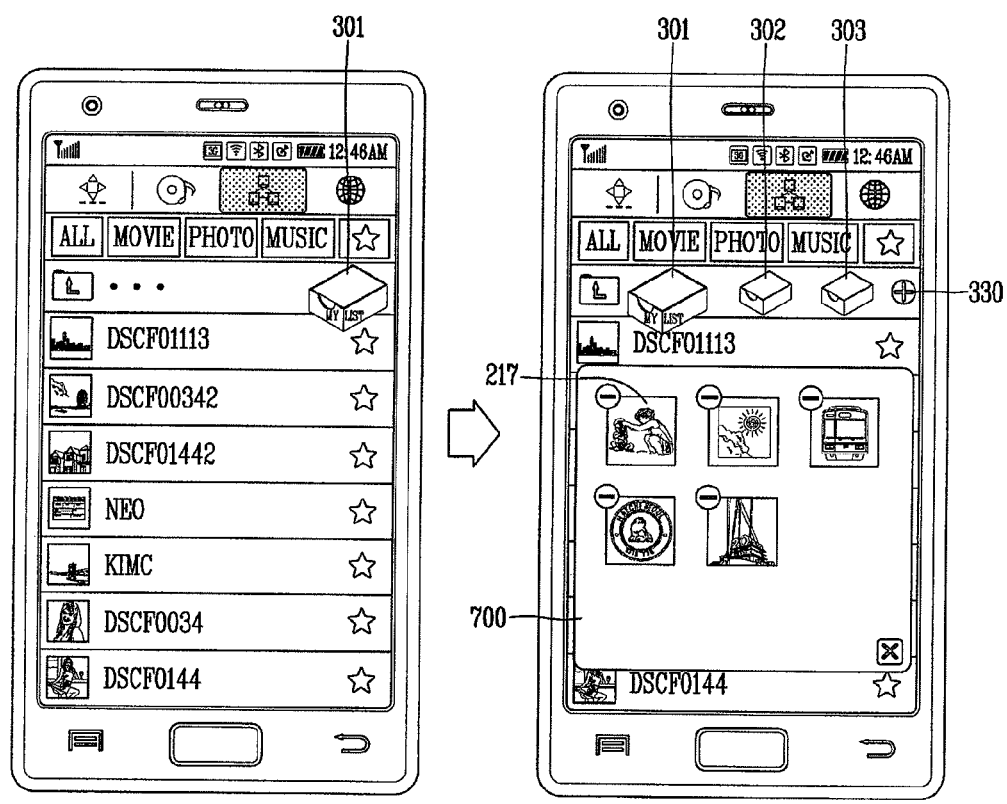
FIG. 5 illustrates an exemplary screen for the method of changing a play list illustrated in FIG. 3.

Referring to FIG. 5A, when the play list 301 displayed on the display unit is selected by the user, then the controller may switch a screen displayed on the display unit to a screen for deleting a multimedia file included in the play list 301, or adding or deleting a play list.

At this time, play lists 301, 302, 303 stored in the memory may be displayed on the display unit of the mobile device. Meanwhile, total play lists stored in the memory and multimedia files included in each play list may be displayed on the display unit by means of a touch input to the play lists. Furthermore, an icon 330 for generating a new play list may be displayed thereon. In addition, multimedia files 217, etc included in the selected play list 301 may be displayed on a new window 700. Here, new displayed objects 301, 302, 303, 330, 700, etc. may be displayed in an overlapped manner on the screen that has been previously displayed.

If the icon 330 for generating a new play list is selected by the user, then the controller may add a new play list to the memory.

Figure 5B:
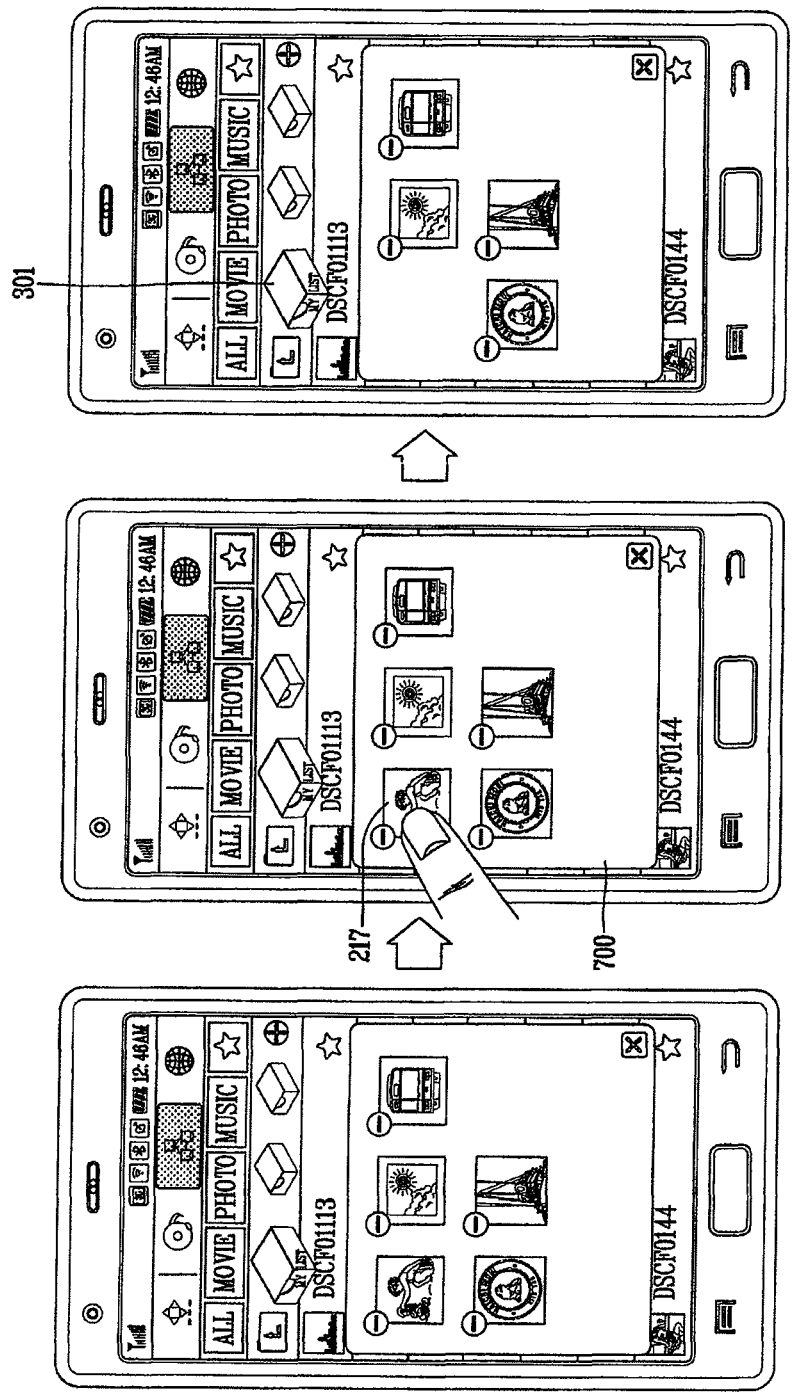

FIG. 5B is an exemplary view illustrating the process of deleting a multimedia file included in the selected play list.

Multimedia files included in the play list 301 may be checked through the window 700. At this time, if a multimedia file 217 desired to be deleted is selected by the user from the multimedia files displayed on the window 700, then the controller may delete the multimedia file 217 from the play list 301. Furthermore, for the user's convenience, a separate icon for deleting the multimedia file may be formed for each multimedia file.

Referring to FIG. 5B, it may be seen that four multimedia files remain in the play list 301 after deleting the multimedia file 217.

If a play list 301 desired to be deleted is selected by the user when it is a control screen capable of deleting a play list, then the controller may delete the play list 301 from the memory. For instance, as illustrated in FIG. 5C, when a sliding touch to the play list is a command for deleting the play list, the user may perform a sliding touch input to the play list 301 to delete the play list 301.

Furthermore, for the user's convenience, a separate icon for deleting the play list may be formed for each play list.

Referring to FIG. 5C, it may be seen that two play lists remain in the play list display region after deleting the play list 301.

Meanwhile, when the play list 301 is deleted from the memory, the controller may display an animation showing that the play list is being deleted to provide a visual interest to the user.

If play lists 302, 303 to be merged are selected by the user when it is a control screen capable of merging play lists, then the controller may merge the play lists 302, 303. Merging the play lists means an operation of changing each multimedia file included in each play list to multimedia files in one play list.

Figure 5D:
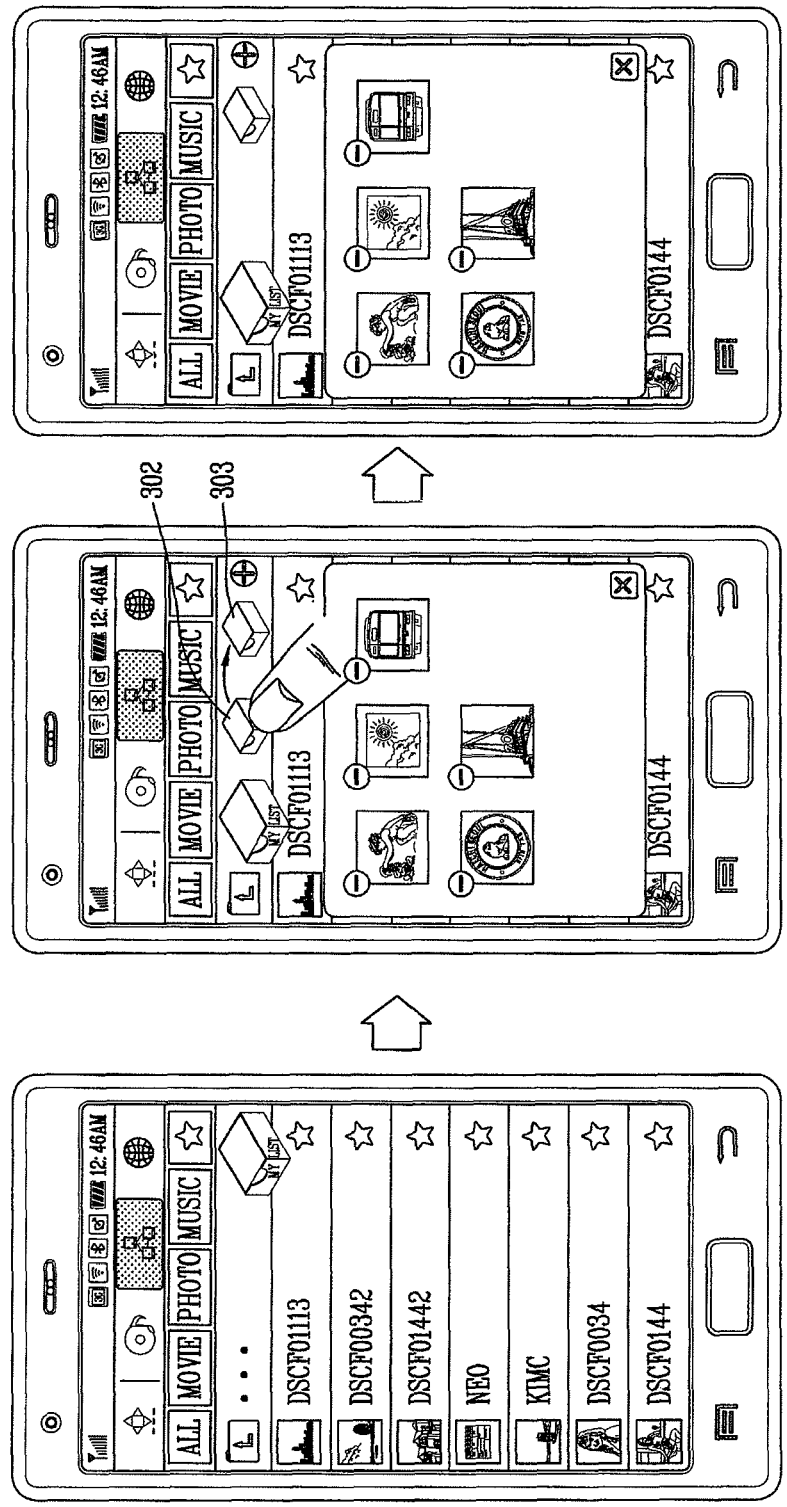

For instance, as illustrated in FIG. 5D, when a dragging touch from a predetermined list 302 to another predetermined list 303 is a command for merging the lists, the user may drag the list 302 to the list 303 to merge the two lists 302, 303. At this time, when there exists a multimedia file commonly included in the lists 302, 303, the controller may process the multimedia file in a predetermined method. For instance, the controller may generate a new list to display a multimedia file in a duplicate state only once in a merged list.

Hereinafter, the detailed process of reproducing a selected content in the reproduction device using the mobile device will be described.

Figure 6:
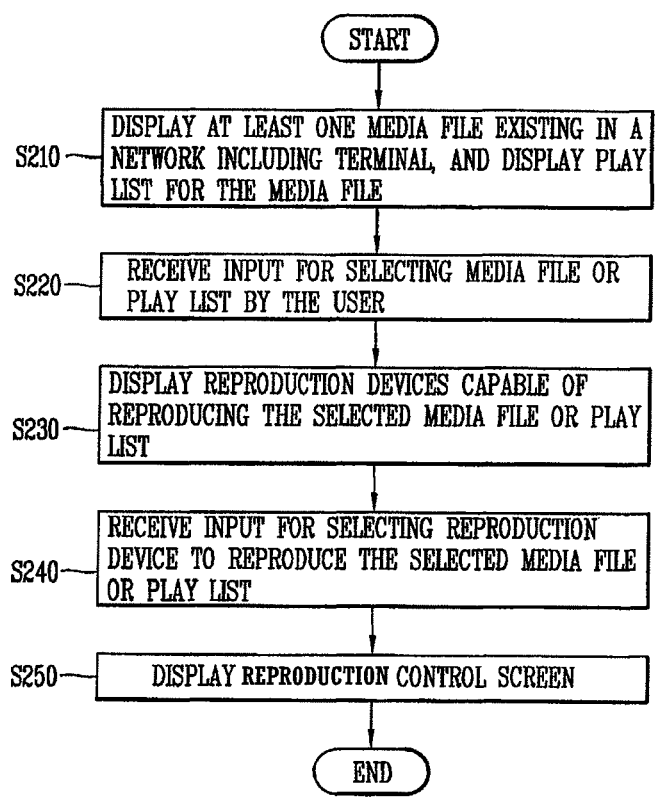
FIG. 6 is a flow chart illustrating a content reproduction method according to an embodiment of the present invention.

FIG. 6 is a flow chart illustrating a content reproduction method according to an embodiment of the present invention, and FIGS. 7 and 8 illustrate exemplary screens for the content reproduction method illustrated in FIG. 6;

As illustrated in FIG. 6, the controller may display contents existing in a network including a terminal on the display unit (S210). The contents may include a multimedia file or a play list for multimedia files. The multimedia file and play list may be displayed in the form of an icon.

Figure 7A:
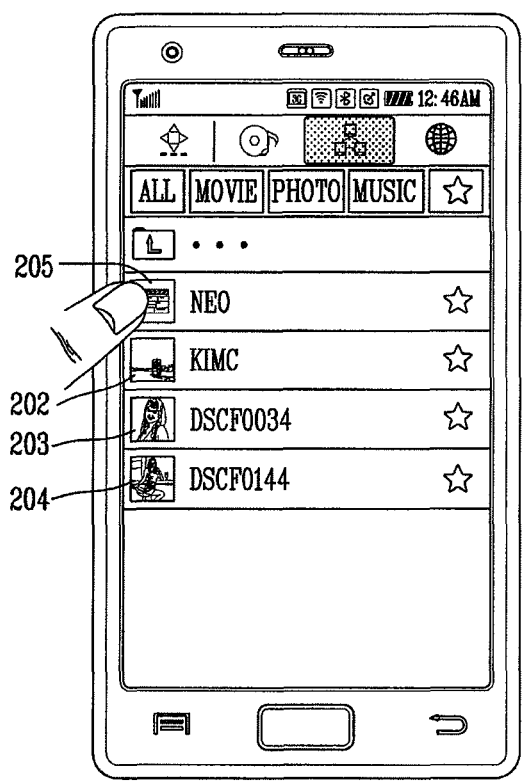
FIG. 7 illustrates an exemplary screen for the content reproduction method illustrated in FIG. 6.
Figure 8A:
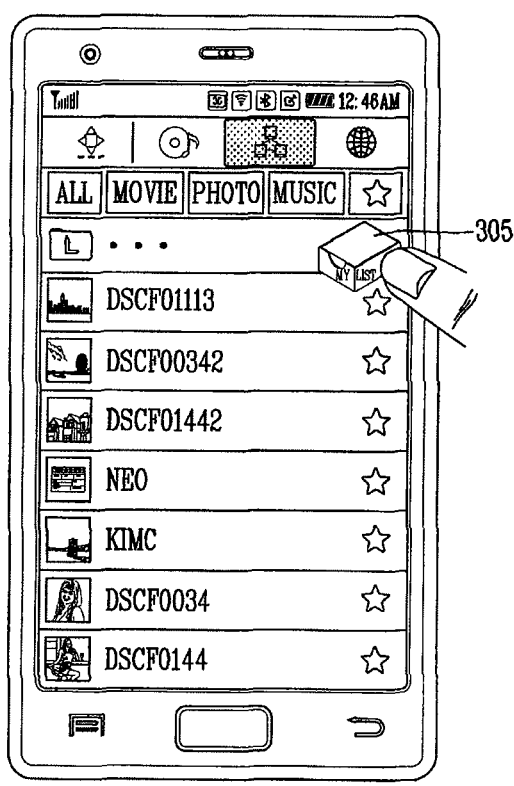
FIG. 8 illustrates an exemplary screen for the content reproduction method illustrated in FIG. 6.

Furthermore, the mobile device may receive an input for selecting a multimedia file or play list by means of a touch input from the user in a state that multimedia files 202, 203, 204, 205, etc. and/or a play list 305 are displayed on the display unit (S220, refer to FIGS. 7A and 8A). For example, the user may perform a single touch to the content desired to be reproduced for more than a predetermined period of time to select the content to be reproduced.

For instance, referring to FIG. 7A, the user may perform a single touch to a multimedia file 205 for more than a predetermined period of time to input a signal for reproducing the multimedia file to the mobile device. Furthermore, referring to FIG. 8A, the user may perform a single touch to a play list 305 for more than a predetermined period of time to input a signal for reproducing the play list to the mobile device.

Next, the controller may display a reproduction device capable of reproducing the selected multimedia file or play list on the display unit (S230). The reproduction device may include a desktop computer, a notebook computer, a portable phone, a smart phone, a blueray disc player, a CD player, a DVD player, a DivX player, an MP3 player, a digital photo frame, and the like. Furthermore, the reproduction device may be connected to a network including a terminal.

Figure 7B:
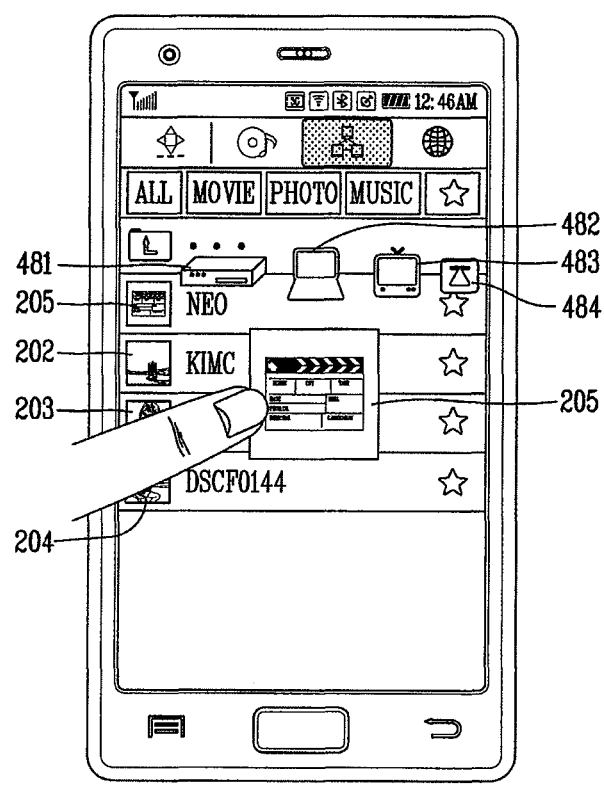
Figure 8B:
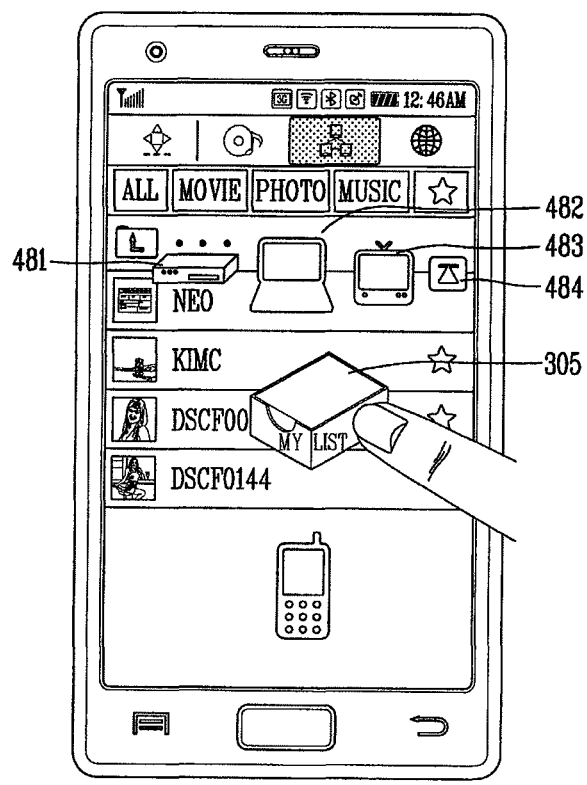

Referring to FIGS. 7B and 8B, reproduction devices 481, 482, 483 capable of reproducing the selected content 205, 305 may be displayed in the form of separate icons for each reproduction device. Furthermore, a separate icon 484 for reproducing the selected content in all reproduction devices connected to the mobile device may be displayed.

Next, the user may perform a touch input for selecting a reproduction device to reproduce the selected content 205, 305.

Figure 7C:
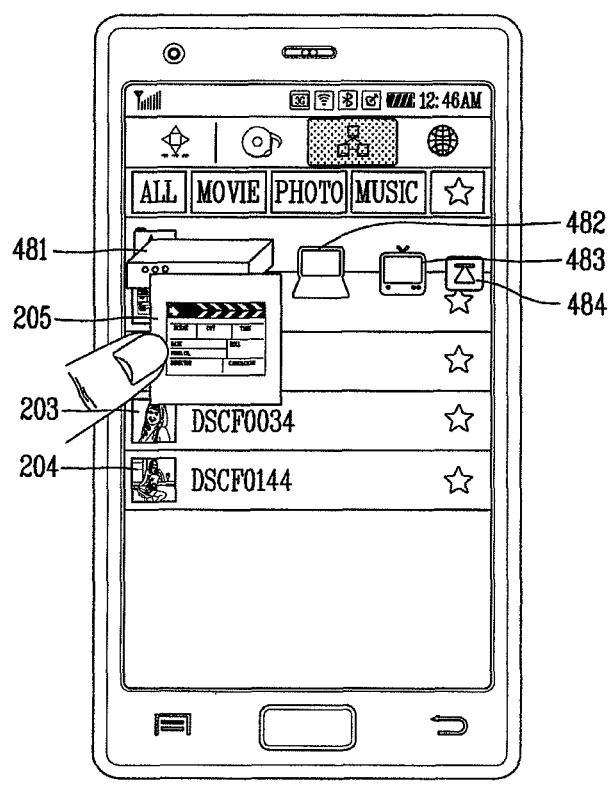

For instance, referring to FIGS. 7B and 7C, the user may perform a dragging touch from the selected multimedia file 205 to the blueray disc player 481 to input a signal for reproducing the multimedia file 205 on the blueray disc player. On the contrary, the user may also perform a dragging touch from the blueray disc player 481 to the selected multimedia file 205 to input a signal for reproducing the multimedia file 205 in the blueray disc player.

Figure 8C:
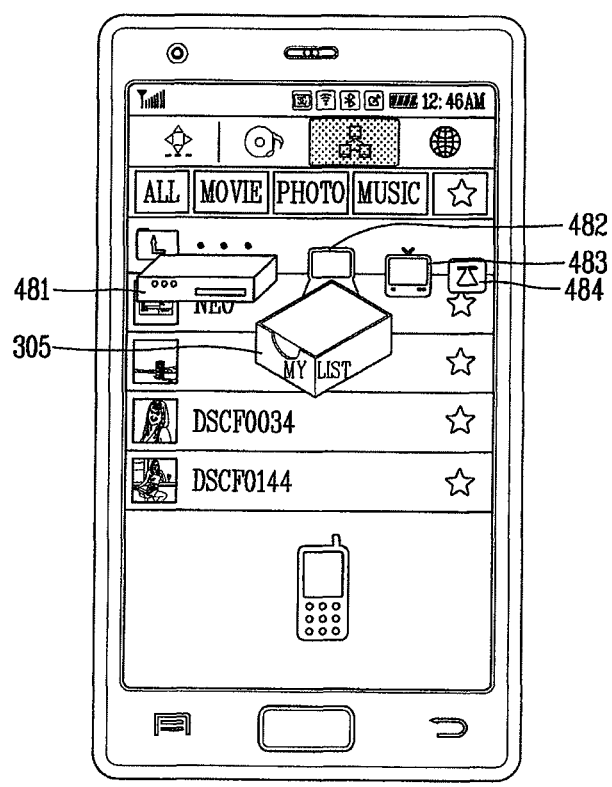

Furthermore, referring to FIGS. 8B and 8C, the user may perform a dragging touch from the selected play list 305 to the notebook computer 482 to input a signal for reproducing a multimedia file included in the play list 305 in the notebook computer. On the contrary, the user may also perform a dragging touch from the notebook computer 482 to the selected play list 305 to input a signal for reproducing a multimedia file included in the play list 305 in the notebook computer.

In this manner, the mobile device may receive an input for selecting a reproduction device to reproduce the selected multimedia file or play list (S240).

Meanwhile, when there exists a multimedia file that is not supported by the selected reproduction device among multimedia files included in the selected play list, reproduction may be carried out by skipping the multimedia file that is not supported by the selected reproduction device, reproduction may be carried out by converting the multimedia file into a multimedia file in a supportable format, reproduction may be carried out in the nearest reproduction device that can support the multimedia file, or reproduction may be carried out by displaying with a reproduction device that can support the multimedia file and receiving the user's selection. Meanwhile, the format conversion of the multimedia file may be carried out by a server or reproduction device. Otherwise, the operation of the reproduction device may be determined by the user's selection.

Accordingly, in this case, the controller may display a message window showing that there exists a multimedia file that is not supported by the selected reproduction device among multimedia files included in the selected play list on the display unit. Furthermore, the user may determine the processing of a multimedia file that is not supported by the selected reproduction device through the message window.

Figure 8D:

For instance, referring to FIG. 8D, the message window may include an item of skipping the multimedia file that is not supported by the selected reproduction device, an item of converting the multimedia file into a multimedia file in a supportable format, an item of reproducing it in the nearest reproduction device that can support the multimedia file, or an item of displaying it with a reproduction device that can support the multimedia file.

If at least one of the items is selected by the user, then the controller may control the operation corresponding to the selected item to be carried out in the selected device.

Meanwhile, when the selected content is selected to be reproduced in all the reproduction devices, it may be necessary to reproduce the content in synchronization with all the device. Therefore, when the selected content is selected to be reproduced in all the reproduction devices, the selected content may be preferably reproduced after completing the preparation for reproducing all the reproduction devices.

In addition, due to a problem caused by a network, a problem caused by an individual reproduction device, or the like, it may happen a case where a plurality of reproduction devices that should reproduce a content in synchronization with one another are unsynchronized. To deal with this case, a control screen may include an icon for performing a timing synchronization between all the reproduction devices or the selected reproduction devices. If the icon is selected by the user, then the controller may control all the reproduction devices or the selected reproduction devices to start content reproduction at the same time in synchronization with a play time of the reproduction device having the latest current play time among the reproduction devices that are reproducing the content.

Hereinafter, an embodiment of controlling a reproduction device using a control screen will be described.

FIG. 9 is a view illustrating a control screen displayed on a display unit of the mobile device controlling a predetermined reproduction device when a predetermined multimedia file is reproduced in the reproduction device. FIG. 10 is a view illustrating a control screen displayed on a display unit of the mobile device controlling a predetermined reproduction device when a predetermined multimedia file list is reproduced in the reproduction device.

FIG. 9A is an exemplary view illustrating the process of checking a multimedia file associated with a predetermined reproduction device. A multimedia file being associated with a predetermined reproduction device means that the multimedia file is included in a play list of the reproduction device.

Referring to FIG. 9A, if the reproduction multimedia file display unit 460 is selected by the user, then the controller may display a multimedia file included in a play list of the reproduction device being reproduced by the mobile device on the display unit. For instance, the multimedia files 206, 207, 208, 209, 210 may be multimedia files included in a play list of the reproduction device displayed on the reproduction device display unit.

Furthermore, by means of a user's touch input to the displayed multimedia files, the controller may control multimedia files 206, 207 prior to the multimedia files currently being reproduced or multimedia files 209, 210 subsequent to the multimedia files currently being reproduced to be displayed thereon. For instance, if a flicking touch is entered to a region displayed with the multimedia files, then multimedia files in the list may be sequentially displayed thereon.

Furthermore, by means of a user's touch input to the selected multimedia file among the displayed multimedia files, the controller may control a reproduction device displayed on the reproduction device display unit to reproduce the selected multimedia file.

Figure 9B:
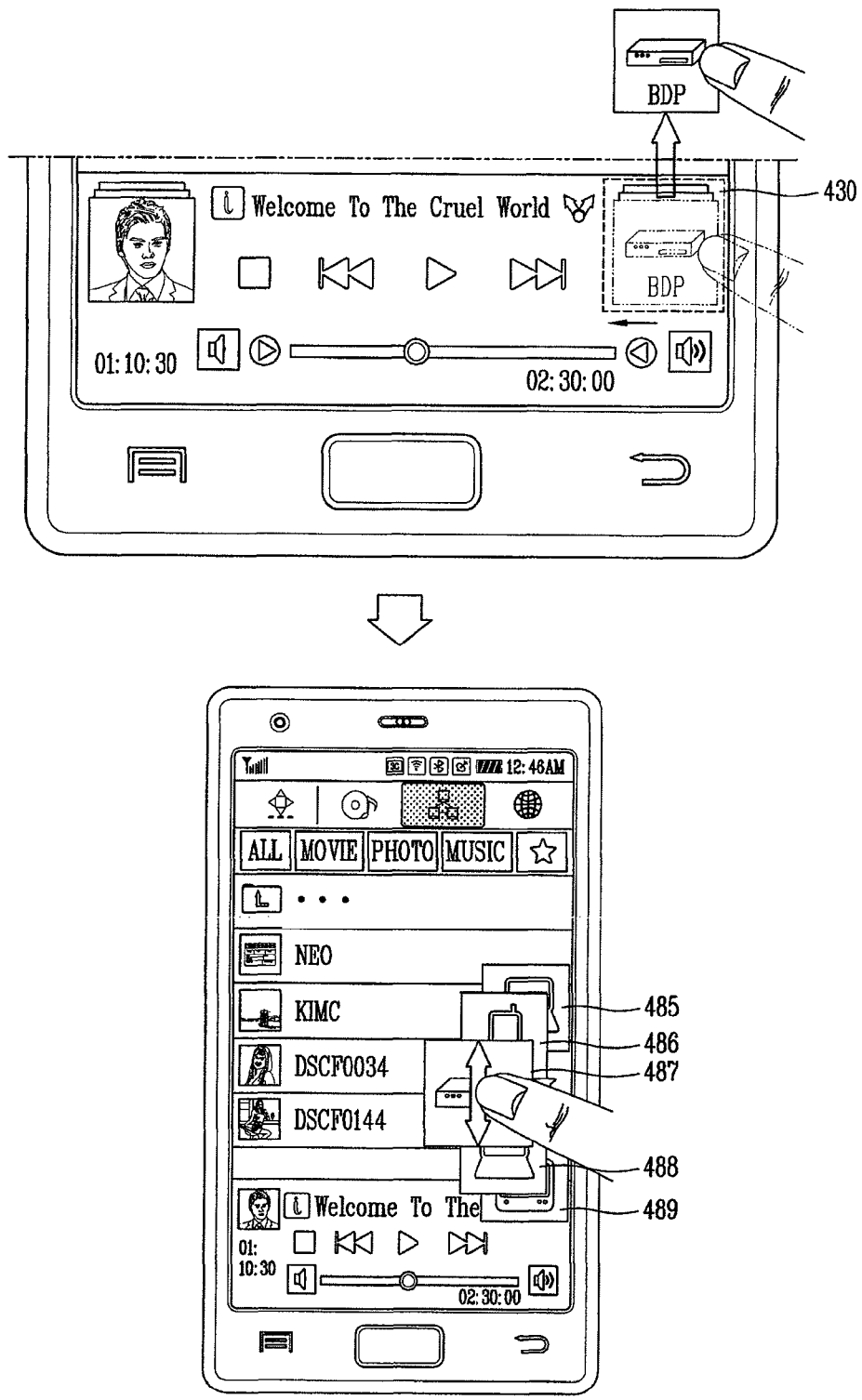
FIG. 9 is a view illustrating a control screen displayed on a display unit of the mobile device controlling a predetermined reproduction device when a predetermined multimedia file is reproduced in the reproduction device.

FIG. 9B is an exemplary view illustrating the process of checking a reproduction device that can be controlled by the mobile device.

Referring to FIG. 9B, if the reproduction device display unit 430 is selected by the user, then the controller may display reproduction devices being controlled by the mobile device on the display unit. For instance, the reproduction devices 485, 486, 487, 488, 489 are reproduction devices that can be controlled by the mobile device. Furthermore, by means of a user's touch input to the displayed reproduction devices, the controller may sequentially display reproduction devices. For instance, if a flicking touch input to a region displayed with the reproduction devices is carried out, then reproduction devices that can be controlled by the mobile device may be sequentially displayed thereon.

Furthermore, by means of a user's touch input to the selected reproduction device among the displayed reproduction devices, the controller may control a reproduced multimedia file displayed on the reproduction multimedia file display unit to be reproduced in the selected reproduction device.

FIG. 9C is an exemplary view illustrating a method of controlling the selected multimedia file to be reproduced in the selected reproduction device.

As described above, if the reproduction multimedia file display unit 460 is selected by the user, then the controller may display a multimedia file included in a play list of the reproduction device being controlled by the mobile device on the display unit. Otherwise, if the reproduction device display unit 430 is selected by the user, then the controller may display a reproduction device being controlled by the mobile device on the display unit.

At this time, the user may perform a touch input to allow the selected multimedia file 211 among the displayed multimedia files to be reproduced in the selected reproduction device 490 among the reproduction devices that can be controlled by the mobile device.

For instance, the user may perform a dragging touch from the selected multimedia file 211 to the selected reproduction device 490 to input a signal for reproducing the selected multimedia file 211 in the selected reproduction device 490.

Meanwhile, when a multimedia file being reproduced in a predetermined reproduction device is selected, and a user's input for reproducing the multimedia file in another reproduction device is carried out, the another reproduction device may reproduce the multimedia file that has finished the reproduction even when the reproduction of the multimedia file is completed.

Figure 10A:
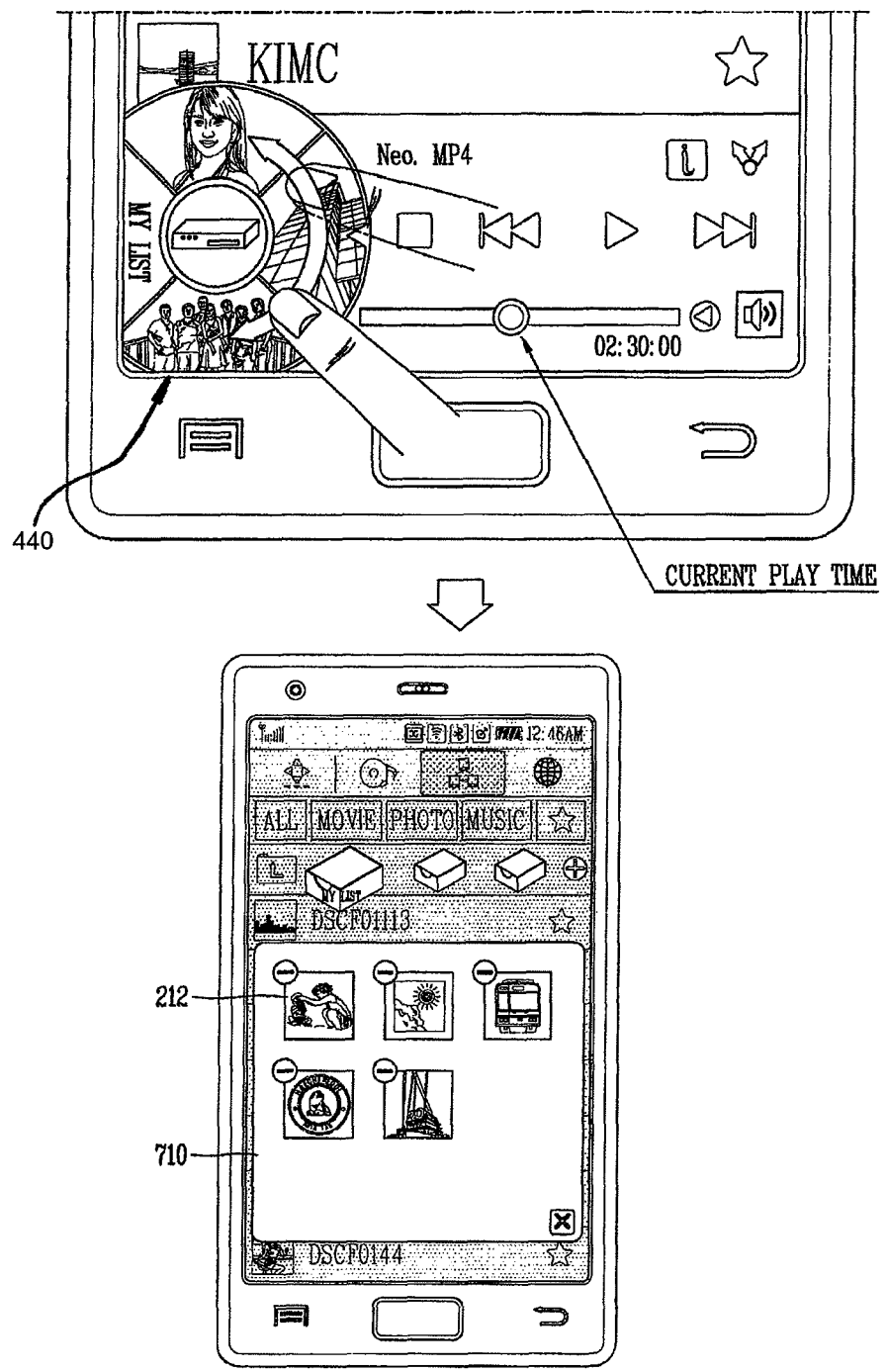
FIG. 10 is a view illustrating a control screen displayed on a display unit of the mobile device controlling a predetermined reproduction device when a predetermined multimedia file list is reproduced in the reproduction device.

FIG. 10A is an exemplary view illustrating the process of checking a multimedia file included in a play list controlled by the mobile device.

Referring to FIG. 10A, if a touch input to the play list display unit 440 is received by the user, then the controller may display a multimedia file included in a play list being controlled by the mobile device on the display unit.

For instance, if a sliding touch input to the play list display unit 440 is received from the user, then the controller may display a new window 710 for displaying multimedia files included in a play list displayed on the play list display unit on the display unit. The window may display multimedia files 212, etc included in the play list.

Furthermore, by means of a user's selection to the displayed multimedia files 212, etc., the controller may control a reproduction device displayed on the reproduction device display unit to reproduce the selected multimedia file.

FIG. 10B is an exemplary view illustrating the process of checking reproduction devices that can be controlled by the mobile device.

Referring to FIG. 10B, if the reproduction device display unit 430 is selected by the user, the controller may display a reproduction device being controlled by the mobile device on the display unit. For instance, the reproduction devices 490, 491, 492 are reproduction devices that can be controlled by the mobile device.

Furthermore, by means of a user's touch input to the selected reproduction device among the displayed reproduction devices, the controller may control a play list displayed on play list display unit to be reproduced in the selected reproduction device.

Figure 10C:
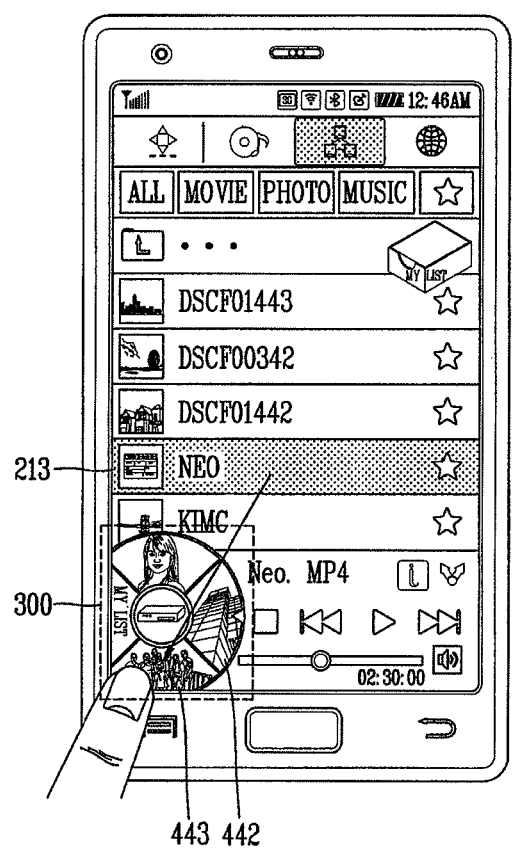

FIG. 10C is an exemplary view illustrating a method of adding the selected multimedia file 213 to a play list being reproduced. When a multimedia file 213 to be added to a play list being reproduced is selected by the user, and the multimedia file is dragged to the play list display unit 300, the controller may add the selected multimedia file to a play list displayed on the play list display unit 300.

Furthermore, according to a position at which a drag touch to the selected multimedia file 213 is carried out, a location where the multimedia file is added to a play list may be determined. For example, when the multimedia file 213 is dragged to the region of displaying a multimedia file 443 to be reproduced subsequent to a multimedia file 442 being reproduced, the multimedia file may be reproduced immediately after finishing the reproduction of the multimedia file currently being reproduced.

Meanwhile, due to a problem caused by a network, a problem caused by an individual reproduction device, or the like, a connection state between a reproduction device that is controlled by a mobile device and the mobile device may be terminated. At this time, the controller may display a message window including information on the state on the display unit. Otherwise, the controller may control a play list being reproduced by the reproduction device to be reproduced by another reproduction device.

FIG. 11 is a view illustrating a method of setting a connection relation between contents and reproduction devices existing in a network including a mobile device.

By means of a user's touch input to a predetermined portion of the control screen, the controller may display a new window 720 for showing a connection relation between a content and a device. The existence of a connection relation between a content and a reproduction device means that the content can be reproduced only in the reproduction device having a connection relation. Otherwise, it means that the reproduction device can reproduce only the content having a connection relation.

Through the window 720, the user may check a connection relation between a content and a reproduction device, and change a connection relation between a content and a reproduction device.

Figure 11A:
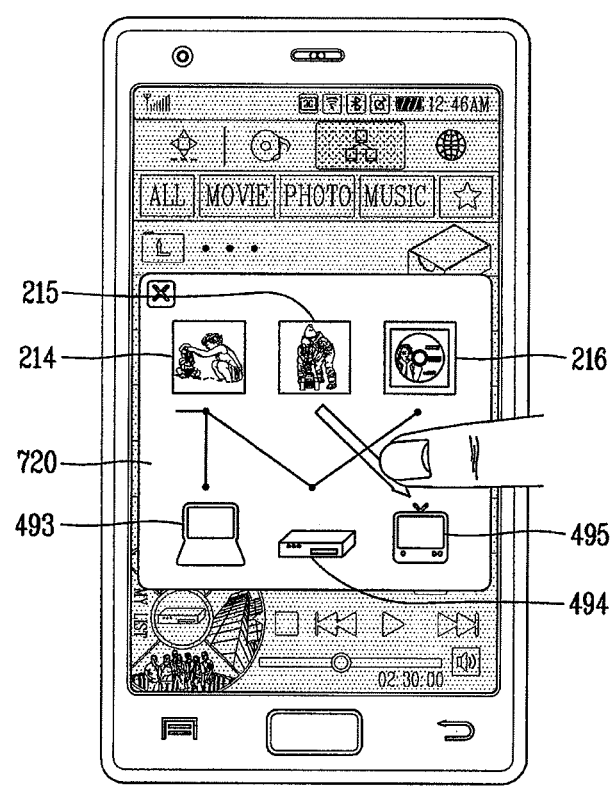
FIG. 11 is a view illustrating a method of setting a connection relation between contents and reproduction devices existing in a network including a mobile device.

As illustrated in FIG. 11A, contents 214, 215, 216 may be arranged in a partial region of the window 720, and reproduction devices 493, 494, 495 may be arranged in a partial region of the window 720. On the other hand, there exists a connection relation between a content and a reproduction device, the content and the reproduction device may be connected by a line to be displayed.

Referring to FIG. 11A, a content 214 is connected by lines with two reproduction device 493, 494, and therefore the user may check that the content 214 can be reproduced in the reproduction devices 493, 494.

Furthermore, the reproduction device 494 is connected by lines with two contents 214, 216, and therefore the user may check that the reproduction device 494 can reproduce the contents 214, 216.

Meanwhile, when there exist complicated connection relations between contents and reproduction devices, the color of a connected line may be displayed in a different manner for each content or reproduction device. For instance, the color of connected lines between the reproduction device 494 and the contents 214, 216 may be displayed in blue, but the color of a connected line between the reproduction device 493 and the contents 214 may be displayed in red.

Meanwhile, if a content and a reproduction device are selected by the user, then the controller may add a connection relation between the selected content and the selected reproduction device. For instance, if the user performs a dragging touch from the content 215 to the reproduction device 495 in the window 720, then a new connection relation may be added thereto.

Next, the process of deleting a connection relation between a content and a reproduction device will be described.

Figure 11B:
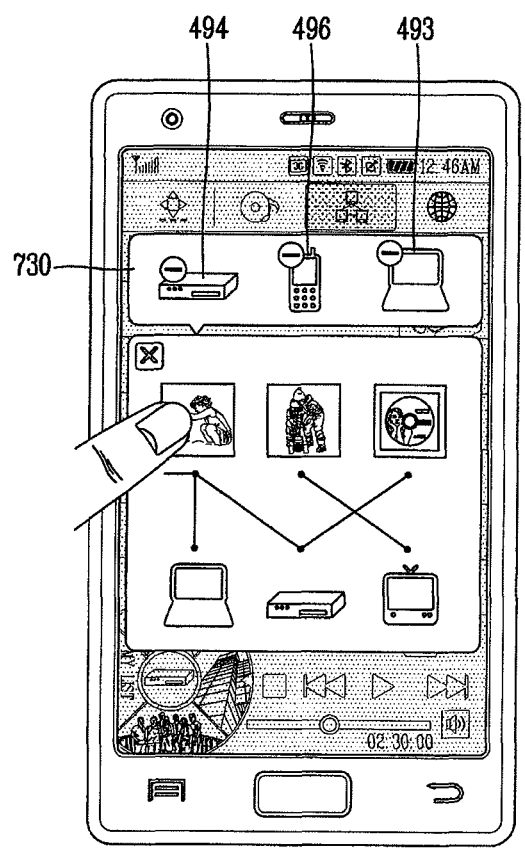

As illustrated in FIG. 11B, if one content 214 among the contents displayed on the window 720 is selected by the user, then the controller may display reproduction devices 493, 494, 495 having connection relations with the content 214 in a separate window 730.

At this time, if a reproduction device having a connection relation with the content desired to be deleted is selected by the user, then the controller may delete a connection relation between the reproduction device and the content. Furthermore, for the user's convenience, a separate icon associated with the deletion of a connection relation may be added to each reproduction device displayed on the window 730.

Figure 11C:
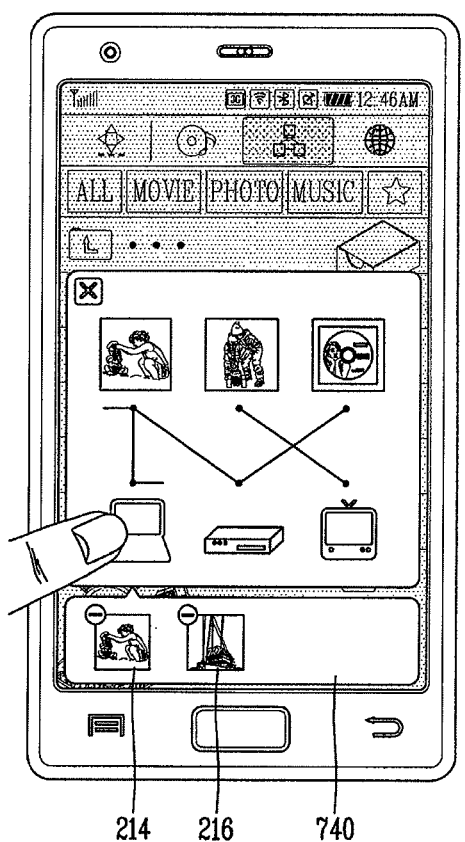

Furthermore, as illustrated in FIG. 11C, if one reproduction device 493 among reproduction devices displayed on the window 720 is selected by the user, then the controller may display contents 214, 216 having connection relations with the reproduction device 493 on a separate window 740.

At this time, if a content having a connection relation with the reproduction device desired to be deleted is selected by the user, then the controller may delete a connection relation between the reproduction device and the content. Furthermore, for the user's convenience, a separate icon associated with the deletion of a connection relation may be added to each content displayed on the window 740.

The foregoing methods according to the present invention may be used in a separate manner or combined manner from or with one another. Furthermore, the steps constituting each embodiment may be used in a separate manner or combined manner from or with the steps constituting another embodiment.

Furthermore, the methods described herein may be implemented in a computer-readable medium using, for example, software, hardware, or some combination thereof.

For a hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, and other electronic units designed to perform the functions described herein.

For a software implementation, procedures and functions described herein may be implemented with separate software modules. The software modules can be implemented with software codes written in a suitable programming language. Also, the software codes may be stored in the storage unit and executed by the processor.

Although the preferred embodiments of the present invention have been described in detail, the rights scope of the present invention is not limited to the embodiments and various modifications and improvements thereto made by those skilled in the art using the basic concept of the present invention as defined in the accompanying claims will fall in the rights scope of the invention.

What is claimed is:

1. A method of controlling a mobile terminal, the method comprising:
    wirelessly communicating, via a wireless communication unit of the mobile terminal, with other devices existing in a network including the mobile terminal;
    displaying, on a display unit of the mobile terminal, a multimedia file display region displaying contents existing in one of the devices in the network including the mobile device; and
    displaying, on the display unit, a reproduction control region including a first region displaying a first reproduction device for reproducing a first content selected from the multimedia file display region, and a second region for displaying the reproduced first content,
    wherein the first region additionally displays at least second reproduction devices for reproducing the selected first content when the first region is touched.

2. The method of claim 1, wherein the reproduction control region further includes a third region displaying a second content to be reproduced by the first reproduction device, and a fourth region displaying a third content already reproduced by the first reproduction device.

3. The method of claim 2, wherein the first, second, third and fourth regions of the reproduction control region are displayed in a wheel-shape with the multimedia display region being displayed at the center of the wheel-shape.

4. The method of claim 1, further comprising:
    displaying a selectable icon for switching to another digital media server; and
    displaying multimedia contents residing on said another digital media server, when the selectable icon is selected.

5. The method of claim 1, further comprising:
    receiving a selection signal indicating a selection of the displayed first content;
    displaying in the first region of the reproduction control region, the first reproduction device and the second reproduction devices;
    receiving a selection signal indicating a selection of a specific reproduction device among the first reproduction and the second reproduction devices; and
    reproducing and displaying the first content using the specific reproduction device.

6. The method of claim 5, wherein the received selections signals for selecting the first content and the specific reproduction device includes a touching and dragging of the first content to the specific reproduction device or a touching and dragging of the specific reproduction device to the first content.

7. The method of claim 1, wherein the contents includes at least one of a movie, a photograph, a music file and a play list.

8. The method of claim 1, wherein the reproduction control region further includes a third region displaying a multimedia play list including files reproduceable by the first reproduction device.

9. The method of claim 8, further comprising:
    displaying a list of the content included in the third region, when the third region is selected; and
    displaying a list of reproduction devices controlled by the mobile terminal, when the first region is selected.

10. The method of claim 9, wherein the displaying steps display the list of the content and the list of reproduction devices in an arc-shape with corresponding content overlapping each other and corresponding reproduction devices overlapping each other.

11. The method of claim 9, further comprising;
    executing a corresponding content by a corresponding reproduction device when the corresponding content and the corresponding reproduction device are touched and dragged into each other.

12. The method of claim 1, further comprising:
displaying a connection relation between a content existing in the network including the mobile device and at least one reproduction device existing in the network including the mobile device,
wherein the connection relation visually indicates whether the content is reproduceable by the at least one reproduction device.

13. The method of claim 12, further comprising:
displaying a connection path with a different characteristic for a corresponding relation between the content and the at least one reproduction device, when there is a relation between the content and the last one reproduction device.

14. The method of claim 1, further comprising:
displaying a play list including the contents existing in one of the devices; and
displaying a screen for changing the play list based on a user's selection,
wherein changing the play list includes at least one of adding a multimedia file to the play list, deleting a multimedia file included in the play list, adding a new play list, deleting a play list, and merging a play list.

15. A mobile terminal, comprising:
a wireless communication unit configured to wirelessly communicate with other devices existing in a network including the mobile terminal;
a memory configured to store content; and
a display unit configured to display a multimedia file display region displaying contents existing in one of the devices in the network including the mobile device, and to display a reproduction control region including a first region displaying a first reproduction device for reproducing a first content selected from the multimedia file display region, and a second region for displaying the reproduced first content,
wherein the first region additionally displays at least second reproduction devices for reproducing the selected first content when the first region is selected.

16. The mobile terminal of claim 15, wherein the reproduction control region further includes a third region displaying a second content to be reproduced by the first reproduction device, and a fourth region displaying a third content already reproduced by the first reproduction device, and
wherein the first, second, third and fourth regions of the reproduction control region are displayed in a wheel-shape with the multimedia display region being displayed at the center of the wheel-shape.

17. The mobile terminal of claim 15, further comprising:
a controller configured to receive a selection signal indicating a selection of the displayed first content, to control the display unit to display in the first region of the reproduction control region, the first reproduction device and the second reproduction devices, to receive a selection signal indicating a selection of a specific reproduction device among the first reproduction and the second reproduction devices, and to reproduce the first content using the specific reproduction device, and
wherein the received selections signals for selecting the first content and the specific reproduction device includes a touching and dragging of the first content to the specific reproduction device or a touching and dragging of the specific reproduction device to the first content.

18. The mobile terminal of claim 15, wherein the reproduction control region further includes a third region displaying a multimedia play list including files reproduceable by the first reproduction device, and
wherein the display unit is further configured to display a list of the content included in the third region, when the third region is selected, and to display a list of reproduction devices controlled by the mobile terminal, when the first region is selected.

19. The mobile terminal of claim 15, wherein the display unit is further configured to display the list of the content and the list of reproduction devices in an arc-shape with corresponding content overlapping each other and corresponding reproduction devices overlapping each other.

20. The mobile terminal of claim 15, wherein the display unit is further configured to display a connection relation between a content existing in the network including the mobile device and at least one reproduction device existing in the network including the mobile device, and
wherein the connection relation visually indicates whether the content is reproduceable by the at least one reproduction device.

21. The mobile terminal of claim 20, wherein the display unit is further configured to display a connection path with a different characteristic for a corresponding relation between the content and the at least one reproduction device, when there is a relation between the content and the last one reproduction device.

22. The mobile terminal of claim 15, wherein the display unit is further configured to display a play list including the contents existing in one of the devices, and display a screen for changing the play list based on a user's selection, and
wherein changing the play list includes at least one of adding a multimedia file to the play list, deleting a multimedia file included in the play list, adding a new play list, deleting a play list, and merging a play list.

* * * * *